A. P. MORAN.
DEVICE FOR PULLING AUTOMOBILES OUT OF MUDHOLES.
APPLICATION FILED MAY 28, 1915.
1,312,079.
Patented Aug. 5, 1919.
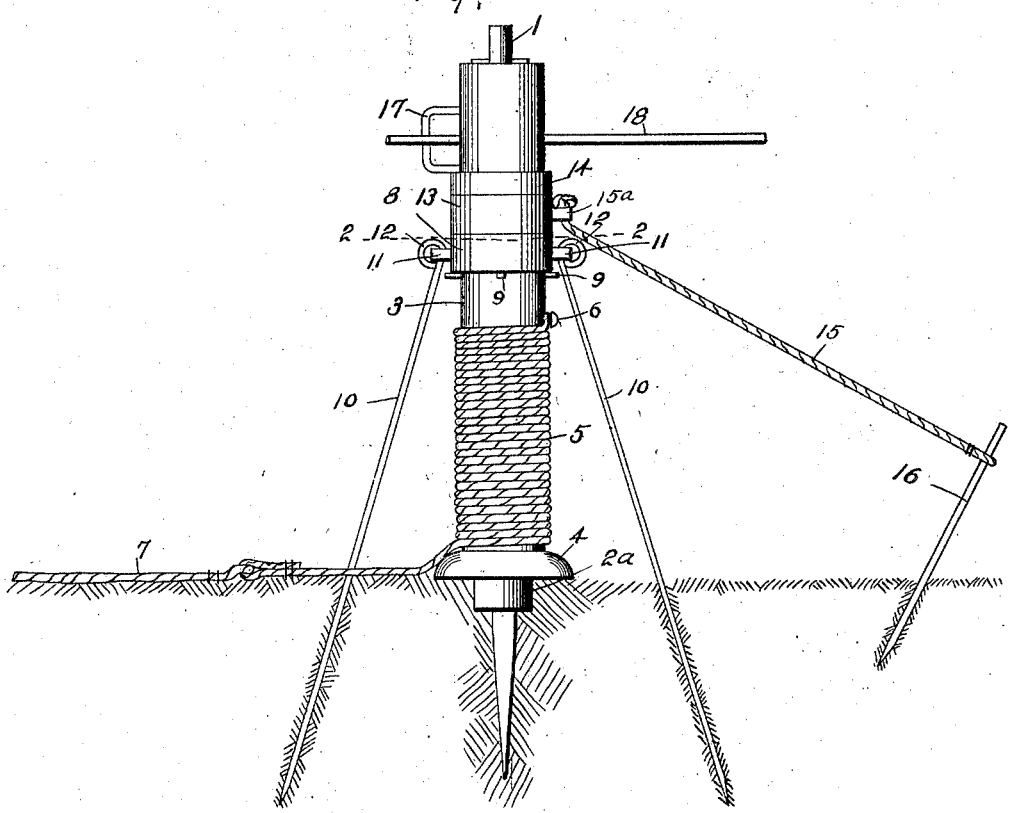
Inventor
A. P. Moran.

UNITED STATES PATENT OFFICE.

ARTHUR P. MORAN, OF CANTON, MONTANA.

DEVICE FOR PULLING AUTOMOBILES OUT OF MUDHOLES.

1,312,079. Specification of Letters Patent. Patented Aug. 5, 1919.

Application filed May 28, 1915. Serial No. 30,929.

*To all whom it may concern:*

Be it known that I, ARTHUR P. MORAN, a citizen of the United States of America, residing at Canton, Montana, in the county of Broadwater and State of Montana, have invented certain new and useful Improvements in Devices for Pulling Automobiles Out of Mudholes, of which the following is a specification.

This invention relates to improvements in mechanical appliances or devices, especially adapted for extricating automobiles out of miry ground or "mud holes" and pulling the same up steep grades or hills, and which provide for effecting such operation manually.

The invention has for its object to carry out that end with facility and in a simple and effective manner.

The invention consists therefore of certain instrumentalities and features of construction substantially as hereinafter fully disclosed and defined by the appended claim.

In the accompanying drawings is illustrated the preferred embodiment of my invention wherein it will be understood that various changes and modifications may be made as to the detailed construction and arrangement of parts without departing from the scope of the claim, and in which drawing—

Figure 1, is an elevational view of my invention.

Fig. 2, is a transverse or horizontal section of the same taken on the line 2—2 of Fig. 1.

In carrying out my invention, I employ a vertical shaft 1, the lower end of which is pointed or tapered to facilitate its penetrating the ground, into which it is driven in any suitable way for use as presently made plain, said shaft being cylindrical in cross section, and having applied thereto a nut $2^a$ a short distance above its point and which nut is sunk or anchored in the ground.

Suitably mounted revolubly upon the shaft 1 is a spool or cylinder 3, terminating at its lower end in a flared annular base 4 resting upon the nut $2^a$ of said shaft, said cylinder or spool providing for the winding thereon of a rope or cable 5 which has one end secured or tied around a pin 6 driven into said cylinder, near its upper end. The rope or cable 5 is suitably contrived or equipped at its opposite end, for suitably attaching the resulting branches 7 thereof, say to the forward axle of an automobile, upon the outer side, as in providing for moving the same under conditions as aforementioned.

In order to provide for the retention of that shaft and cylinder in up-right position, a ring 8 is applied to said cylinder suitably below its upper end and so as to allow of its turning, said ring resting upon projections or studs 9 on the cylinder and having suitably connected thereto rods 10 with their lower ends embedded or anchored in the ground. The connection between the ring 8 and the rods or anchors 10 is preferably effected by means of apertured lugs 11 on the ring and looping the upper ends of the rods or anchors as at 12 into the apertures of said lugs.

A second or stay ring 13 and a third or clearing-ring 14 are also applied to the cylinder 3, one above the other, the ring 13 being arranged above the ring 8, and the staying 13 being braced by a flexible member, rope or cable 15 suitably secured thereto as at 15 and to a stake 16 suitably driven into the ground at a point opposite the resistance.

The cylinder 3, is also equipped near its upper end with a lateral staplelike member or loop 17, suitably arranged to receive the end of a hand-bar 18, for manually actuating or turning the cylinder.

I claim—

A device of the type described, comprising a shaft having a pointed lower end arranged to be driven into the ground, a cylinder revolubly mounted upon said shaft, said shaft being cylindrical in cross-section, a nut provided therefor a short distance from its pointed end, said cylinder having integral with its lower end a flared annular base adapted to rest and rotate upon said nut, a ring encircling the cylinder comprising apertured lugs secured thereto, looped rods, the upper ends of which rods are connected to said lugs, their lower ends extending into the ground, studs protruding from the cylinder to retain the ring in elevated position, a second ring, a flexible member arranged adjacently above the first ring, said second ring being held against rotation by said flexible member one end of which flexible member is secured to said second ring the other end being anchored to a stake in the ground, means adapted to be interposed between the cylinder and an automobile, and means for rotating said cylinder.

In testimony whereof I affix my signature in presence of two witnesses.

ARTHUR P. MORAN.

Witnesses:
BISMARK WILLIAMS,
LYNDSAY B. JOBB.

Copies of this patent may be obtained for five cents each, by addressing the "Commissioner of Patents, Washington, D. C."